United States Patent [19]

Terano et al.

[11] Patent Number: 4,562,173
[45] Date of Patent: Dec. 31, 1985

[54] CATALYST COMPONENT FOR THE POLYMERIZATION OF OLEFINS AND CATALYST THEREFOR

[75] Inventors: Minoru Terano, Chigasaki; Kouhei Kimura, Kanagawa; Atsushi Murai, Chigasaki; Masuo Inoue, Chigasaki; Katsuyoshi Miyoshi, Chigasaki, all of Japan

[73] Assignee: Toho Titanium Co., Ltd., Tokyo, Japan

[21] Appl. No.: 675,557

[22] Filed: Nov. 28, 1984

[30] Foreign Application Priority Data

Aug. 24, 1984 [JP] Japan ................. 59-175230

[51] Int. Cl.$^4$ .............................................. C08F 4/64
[52] U.S. Cl. ................................. 502/127; 502/125; 502/133; 526/124
[58] Field of Search ................... 502/125, 127, 133

[56] References Cited

U.S. PATENT DOCUMENTS

| | | | |
|---|---|---|---|
| 3,647,772 | 3/1972 | Kashiwa | 502/127 X |
| 4,328,122 | 5/1982 | Monte et al. | 502/127 |
| 4,439,537 | 3/1984 | Murai et al. | 502/127 X |
| 4,460,701 | 7/1984 | Terano et al. | 502/133 X |

FOREIGN PATENT DOCUMENTS

| | | |
|---|---|---|
| 94590 | 7/1979 | Japan . |
| 204004 | 11/1983 | Japan . |
| 23404 | 2/1985 | Japan . |

*Primary Examiner*—Patrick P. Garvin
*Attorney, Agent, or Firm*—Fisher, Christen & Sabol

[57] ABSTRACT

A catalyst for the polymerization of olefins comprising:
(A) a catalyst component obtained by a process comprising contacting (a) a fatty acid salt of magnesium, (b) a carbonate of magnesium or a substance containing said carbonate, (c) diester of an aromatic dicarboxylic acid, and (d) a titanium halide of the general formula: $TiX_4$, wherein X represents a halogen atom;
(B) a silicon compound represented by the general formula: $SiR_m(OR')_{4-m}$, wherein R is hydrogen, alkyl group or aryl group, R' is alkyl group or aryl group, and m is represented as $0 \leq m \leq 4$; and
(C) an organoaluminium compound.

Polymerization of olefins by use of the catalyst provides such advantages as high polymerization activity per unit weight of the catalyst component, prolonged polymerization activity, high yield of stereoregular polymer, and a produced polymer free of such an estereal odor as in the prior art, and having high bulk density as well as uniform particle size and shape.

20 Claims, No Drawings

CATALYST COMPONENT FOR THE POLYMERIZATION OF OLEFINS AND CATALYST THEREFOR

BACKGROUND OF THE INVENTION (1) Field of the Invention

This invention relates to an improved catalyst component for the polymerization of olefins and a catalyst therefor which are capable of providing high polymerization activity per unit weight of the catalyst component and high yield of stereoregular polymer when applied to the polymerization of olefins, and more particularly relates to a catalyst component obtained by contacting a fatty acid salt of magnesium, a carbonate of magnesium or a substance containing said carbonate, diester of an aromatic dicarboxylic acid and a titanium halide, and to a catalyst therefor comprising the catalyst component, a silicon compound and an organoaluminium compound, where polymerization includes homopolymerization and copolymerization thereof.

(2) Description of the Prior Art

A catalyst for the polymerization of olefins formed by combining a solid titanium halide as a catalyst component with an organoaluminium compound is well known in the art. However, in the polymerization of olefins by use of the conventional catalyst, the yield of polymer per unit weight of the catalyst component or of titanium moiety in the catalyst component (hereinafter referred to simply as a polymerization activity per unit weight of the catalyst component or of titanium) is so low that the so-called deashing process for subsequently removing catalyst residues from the produced polymer is indispensable in order to obtain an industrially applicable polymer. In the deashing process, alcohols or chelating agents are used in large amounts, so that the deashing process needs an apparatus for recovery thereof as well as the deashing apparatus itself, and consequently has many problems accompanying therewith relative to resources, energy, and the like. Thus, the deashing process raises great problems to be solved urgently in the art. A number of studies and suggestions have been made for enhancing the polymerization activity per unit weight of titanium in the catalyst component, so that the complicated deashing process may be dispensed with.

Especially as a recent tendency, a large number of suggestions have been made such that the polymerization activity per unit weight of titanium in the catalyst component is remarkably enhanced in the polymerization of olefins with a catalyst component prepared by supporting a transition-metal compound as an active ingredient such as a titanium halide on a carrier material so that the active ingredient may act effectively.

However, the prior art employing magnesium chloride as the carrier as described above, has such a disadvantage that the chlorine moiety contained in the magnesium chloride conventionally used as the carrier has an adverse effect on the produced polymer, resulting in leaving problems to be solved such as requirements for such a high activity as to be substantially free from the adverse effect due to the chlorine moiety, or as requirements for controlling a concentration of the magnesium chloride itself at a sufficiently low level.

The present inventors proposed a process for preparing a catalyst component for the polymerization of olefins in Japanese Patent Laid-Open Application No. 204004/1983 for an object of reducing a chlorine content in the produced polymer with high polymerization activity and high yield of stereoregular polymer, attaining the aforementioned object. The aforesaid Japanese Patent Laid-Open Application No. 204004/1983 discloses a process for the preparation of catalyst component for the polymerization of olefins which process comprises contacting (a) a fatty acid salt of magnesium, (b) an electron donor compound, (c) a titanium halide of the general formula: $TiX_4$, wherein X represents a halogen atom, and a carbonate of magnesium or a substance containing said carbonate. Although the aforesaid Japanese Patent Laid-Open Application No. 204004/1983 further discloses that the electron donor compound preferably includes ethyl benzoate, ethyl p-anisate and ethyl p-toluate, said Japanese Patent Laid-Open Application No. 204004/1983 teaches nothing about the use of the diester of the aromatic dicarboxylic acid as used in the present invention. The aforesaid Japanese Patent Laid-Open Application No. 204004/1983 also discloses the use of only ethyl p-toluate as an electron donor compound on polymerization as shown in Examples, but teaches nothing about the use of the silicon compound used in the present invention on polymerization. Moreover, the catalyst component obtained by the process of Japanese Patent Laid-Open Application No. 204004/1983 is not satisfactory in improvements of polymerization activity per unit weight of the catalyst component and of yield of stereoregular polymer, and in reduction of chlorine content in the produced polymer, development of a catalyst having improved catalyst performances having been demanded in the art. Further, it is essential for a catalyst formed by combining a catalyst component using magnesium chloride as a carrier with an organoaluminium compound to carry out on an industrial scale the polymerization of olefins, especially stereoregular polymerization of propylene, 1-butene, and the like in the presence of an electron donor compound such as aromatic carboxylic acid esters in the polymerization system. However, the aforementioned aromatic carboxylic acid ester imparts a peculiar estereal odor to the produced polymer and the amount thereof is increased to a relatively large amount when polymerization is carried out in the presence thereof, raising a serious problem of deodorizing therefrom in the art.

It was substantially impossible for the so-called highly active supported catalyst formed by use of a catalyst component employing the aforementioned magnesium chloride as a carrier to be of practical use, because use of the supported catalyst results in abrupt deactivation thereof in spite of high activity thereof in the beginning of polymerization, and results in raising problems in process operations, particularly in the case where a prolonged polymerization time is required as in block copolymerization and the like. In order to solve the aforementioned problems, Japanese Patent Laid-Open Publication No. 94590/1979 discloses a catalyst for the polymerization of olefins which comprises a catalyst component prepared by use of magnesium dihalide as one of the starting materials, an organoaluminium compound, an aromatic carboxylic acid ester, and a compound having a M—O—R group. However, the catalyst disclosed as above fails to solve the problem of deodorizing from the produced polymer in that organic carboxylic acid esters are used on polymerization, and requires complicated procedures for the preparation thereof with practically insufficient catalyst performance and polymerization activity with time.

In order to solve the aforesaid problem, the present inventors have proposed a novel catalyst component and catalyst. The catalyst for the polymerization of olefins comprises: (A) a catalyst component obtained by a process comprising contacting (a) a fatty acid salt of magnesium and (b) a dialkoxymagnesium, (c) mono or diester of an aromatic dicarboxylic acid, (d) a halogenated hydrocarbon, and (e) a titanium halide of the general formula: $TiX_4$, wherein X represents a halogen atom, (B) a silicon compound represented by the general formula: $SiR_m(OR')_{4-m}$, wherein R is hydrogen, alkyl group or aryl group, R' is alkyl group or aryl group, and m is represented as $0 \leq m \leq 4$, and (C) an organoaluminium compound.

In addition to the aforesaid problems in the prior art, need for providing a catalyst which is capable of providing a polymer having narrow particle size distribution and high bulk density, as well as uniform particle shape has recently been increased in the art. The catalyst component and catalyst described above by the present inventors have excellent performances including a prolonged polymerization activity with time, but are not satisfactory to meet the aforesaid needs in the art. The aforesaid uniformness in the particle size and shape of the produced polymer provides such advantages in the art as to make it easy to handle the produced polymer and to make it possible to omit the pelletizing step, and particularly has a great importance taking into consideration the application of the catalyst having uniform particle size and shape to the gas phase polymerization to which attention has recently been made in the art.

SUMMARY OF THE INVENTION

An object of the present invention is to provide a catalyst component for the polymerization of olefins and a catalyst therefor which are capable of resulting in greatly reducing both the amount of the catalyst residues and halogen content in the produced polymer to such an extent that the deashing process may be completely dispensed with.

Another object of the present invention is to provide a catalyst component for the polymerization of olefins and a catalyst therefor which are capable of resulting in high polymerization activity and in much smaller decrease of the polymerization activity with time, or a prolonged polymerization activity.

Still another object of the present invention is to provide a catalyst component for the polymerization of olefins and a catalyst therefor which are capable of resulting in high yield of stereoregular polymer and of the produced polymer free of such an estereal odor as imparted in the case where aromatic carboxylic acid esters are used as the electron donor compound in the prior art.

Still another object of the present invention is to provide a catalyst component for the polymerization of olefins and a catalyst therefor which are capable of resulting in little or no reduction in both the polymerization activity and yield of stereoregular polymer in the case where polymerization of olefins is carried out in the presence of hydrogen and the produced polymer has a very high melt index.

Still another object of the present invention is to provide a catalyst component for the polymerization of olefins and a catalyst therefor the use of which makes it possible to obtain a produced polymer having a narrow particle size distribution, a high bulk density, and a uniform particle shape so as to be easily handled and so that pelletizing may be omitted, results in increasing the substantial plant capacity, and which are also applicable to the gas phase polymerization.

That is, the present invention provides a catalyst component (A) for the polymerization of olefins obtained by a process comprising contacting (a) a fatty acid salt of magnesium and (b) a carbonate of magnesium or a substance containing said carbonate, (c) diester of an aromatic dicarboxylic acid, and (d) a titanium halide of the general formula: $TiX_4$, wherein X represents a halogen atom (hereinafter may be referred to as a titanium halide), said catalyst component being used in combination with (B) a silicon compound represented by the general formula: $SiR_m(OR')_{4-m}$, wherein R is hydrogen, alkyl group, or aryl group, R' is alkyl group or aryl group, and m is represented as $0 \leq m \leq 4$ (hereinafter may be referred to as a silicon compound), and with (C) an organoaluminium compound; and a catalyst for the polymerization of olefins comprising: (A) a catalyst component obtained by a process comprising contacting (a) a fatty acid salt of magnesium and (b) a carbonate of magnesium or a substance containing said carbonate, (c) diester of an aromatic dicarboxylic acid, and (d) a titanium halide of the general formula: $TiX_4$, wherein X represents a halogen atom, (B) a silicon compound represented by the general formula: $SiR_m(OR')_{4-m}$, wherein R is hydrogen, alkyl group or aryl group, R' is alkyl group or aryl group, and m is represented as $0 \leq m \leq 4$, and (C) an organoaluminium compound.

DETAILED DESCRIPTION OF THE PREFERRED EMBODIMENTS

Examples of the fatty acid salt of magnesium used in the present invention preferably include saturated fatty acid salt of magnesium, more preferably magnesium stearate, magnesium octanoate, magnesium decanoate, and magnesium laurate.

The carbonate of magnesium or the substance containing said carbonate used in the present invention preferably includes basic magnesium carbonate, magnesium carbonate, and hydrotalcite.

Examples of diester of aromatic dicarboxylic acid preferably include diester of phthalic acid or terephthalic acid, more specifically, dimethylphthalate, dimethylterephthalate, diethylphthalate, diethylterephthalate, dipropylphthalate, dipropylterephthalate, dibutylphthalate, dibutylterephthalate, diisobutylphthalate, diamylphthalate, diisoamylphthalate, ethylbutylphthalate, ethylisobutylphthalate, ethylpropylphthalate, and the like.

Examples of the titanium halide represented by the general formula $TiX_4$ wherein X is a halogen atom, include titanium tetrachloride, titanium tetrabromide, titanium tetraiodide, and the like, the titanium tetrachloride being preferred.

The silicon compound used in the present invention includes phenylalkoxysilane, alkylalkoxysilane, and the like. Examples of phenylalkoxysilane include phenyltrimethoxysilane, phenyltriethoxysilane, phenyltripropoxysilane, phenyltriisopropoxysilane, diphenyldimethoxysilane, diphenyldiethoxysilane, and the like. Examples of alkylalkoxysilane include tetramethoxysilane, tetraethoxysilane, trimethoxyethylsilane, trimethoxymethylsilane, triethoxymethylsilane, ethyltriethoxysilane, ethyltriisopropoxysilane, and the like.

Examples of the organoaluminium compound used in the present invention include trialkylaluminum, dialkylaluminium halide, alkylaluminium dihalide, and mixtures thereof, preferably trialkylaluminium, more preferably triethylaluminium and triisobutylaluminium. The order and method of contacting the starting materials from which the catalyst component is prepared are not specifically limited, but preferably include (1) a process which comprises pretreating the ingredients (a), (b) and (c) by copulverization, suspension into a halogenated hydrocarbon or by mixing for contact in an organic solvent, and mixing for contact the resulting mixture with the ingredient (d) at a temperature of from 0° C. to 130° C. for a period of from 5 minutes to 100 hours;

(2) a process which comprises mixing for contact the ingredients (a), (b) and (d) with each other, and mixing for contact the resultant reaction mixture with the ingredient (c) at a temperature of from 0° C. to 130° C. for a period of from 5 minutes to 100 hours;

(3) a process which comprises mixing for contact the ingredients (a), (b), (c) and (d) simultaneously at a temperature of from 0° C. to 130° C., preferably 50° C. to 130° C., for a period of from 5 minutes to 100 hours, preferably 10 minutes to 10 hours; and (4) a process which comprises contacting any two ingredients of the ingredients (a), (b), (c) and (d) with each other to be mixed for contact with the remaining two ingredients.

A surface active agent may be added at any time in the course of the preparation of the catalyst component as above.

The copulverization in the pretreatment may be carried out in a mill such as a ball mill, a vibratory mill or the like at a temperature of from 0° C. to 80° C. for a period of from 5 minutes to 100 hours.

Preferred examples of the halogenated hydrocarbon used in the pretreatment include chlorobenzene, o-dichlorobenzene, benzyl chloride, propyl chloride, butyl chloride, dichloroethane, carbon tetrachloride, chloroform and methylene dichloride, and mixtures thereof.

Preferred examples of the organic solvent used in the pretreatment include toluene, xylene, and the like.

The procedure of mixing for contact in the present invention may be effected by use of any conventional mixing devices such as a stirrer.

The amount to be used of the ingredients for the preparation of the catalyst component is not specifically limited unless it has adverse effects on the performance of the catalyst component formed therefrom, but diester of aromatic dicarboxylic acid is used normally in an amount of from 0.01 to 2 g, and the titanium halide is used normally in an amount more than 0.1 g, preferably more than 1 g per 1 g of the fatty acid salt of magnesium and the carbonate of magnesium or the substance containing said carbonate respectively. The carbonate of magnesium or the substance containing said carbonate as the ingredient (b) is used in an amount of from 0.01 to 1 g, preferably 0.05 to 1.0 g per 1 g of the fatty acid salt of magnesium as the ingredient (a).

The compositions obtained according to the aforementioned processes in the preparation of the catalyst component may be further brought into contact once or more times with the titanium halide, and also may be washed with an organic solvent such as n-heptane.

All the procedures described above in the present invention should be preferably conducted in the absence of oxygen, water, etc.

The catalyst component thus obtained is combined with the aforementioned silicon compound and an organoaluminium compound to form a catalyst for the polymerization of olefins. The organoaluminium compound is used in a molar ratio of from 1 to 1000 per atom of titanium in the catalyst component, and the silicon compound is used in a molar ratio of less than 1, preferably from 0.005 to 0.5 per mole of the organoaluminium compound.

The polymerization of olefins may be performed in the presence of, or in the absence of an organic solvent, and olefin monomers may be used in the gaseous or liquid state.

The polymerization temperature is below 200° C., preferably below 100° C., and the polymerization pressure is below 100 kg/cm$^2$ gauge, preferably below 50 kg/cm$^2$ gauge.

Examples of olefins homopolymerized or copolymerized by use of the catalyst component and the catalyst of the present invention include ethylene, propylene, 1-butene, and the like.

Polymerization of olefins by use of the catalyst component or the catalyst of the present invention shows such a high catalyst activity to say nothing of an extremely high stereoregularity in the produced polymer that the amount of the catalyst residues in the produced polymer is reduced to a very low level, and chlorine content in the produced polymer is reduced to a trace amount, resulting in that influence of chlorine on the produced polymer is reduced to such an extent that the deashing process may be completely dispensed with.

Since chlorine contained in the produced polymer causes corrosion of devices employed in such steps as pelletizing and molding, and further causes deterioration, yellowing, etc. of the produced polymer itself, reduction of chlorine content in the produced polymer as above has an extremely important meaning in the art.

Further according to the present invention, the problem of the estereal odor in the produced polymer has been solved by the use of the silicon compound instead without using aromatic carboxylic acid esters on polymerization, and such a substantial defect of the so-called highly active supported catalyst as mentioned above that catalyst activity per unit time is greatly reduced as polymerization proceeds has been overcome to provide a catalyst practically applicable to copolymerization of olefins as well as homopolymerization thereof.

It is of a common practice in the preparation of olefin polymer on an industrial scale that polymerization is carried out in the presence of hydrogen from the standpoints of controlling the melt index of polymer, etc., and the catalyst formed from the catalyst component prepared by use of magnesium chloride as a carrier in the prior art has such a disadvantage that both catalytic activity and stereoregularity of the polymer are greatly reduced. However, polymerization of olefins in the presence of hydrogen using the catalyst of the present invention provides such an effect that little or no decrease in catytic activity and in stereoregularity of the polymer is observed in spite of a very high melt index of the polymer, providing extremely great advantages in the art.

The present invention provides by a very simple process a catalyst component for the polymerization of olefins and a catalyst therefor the use of which makes it possible to obtain a produced polymer having a narrow particle size distribution, a high bulk density, and a uniform particle shape so as to be easily handled and so that pelletizing may be omitted, results in increasing the substantial plant capacity, and which are also applicable to the gas phase polymerization.

The following Examples and Comparative Examples illustrate the present invention more in detail.

EXAMPLE 1

(Preparaton of catalyst component)

To a 200 ml round flask fitted with a stirrer and thoroughly purged with nitrogen are charged 10 g of magnesium stearate, 2.0 g of basic magnesium carbonate, 1.2 g of dibutylphthalate, and 25 ml of TiCl$_4$ to be reacted with agitation at 110° C. for 2 hours. After the completion of the reaction, a reaction product is washed 10 times with 100 ml of dehydrated n-heptane at 40° C., and 25 ml of fresh titanium tetrachloride is added thereto for reacting with agitation at 110° C. for 2 hours. After the completion of the reaction, the reaction mixture is cooled down to 40° C. A washing procedure with 100 ml of dehydrated n-heptane at 40° C. is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 3.10% by weight.

Polymerization of propylene

To a 2.0 liter autoclave fitted with a stirrer, the air in which is thoroughly replaced by nitrogen, 700 ml of n-heptane, 301 mg of triethylaluminium, 32 mg of phenyltriethoxysilane and 0.3 mg as titanium atom of the catalyst component obtained as above are charged in an atmosphere of nitrogen. Thereafter 120 ml of hydrogen gas is charged thereinto and the resulting mixture is heated to 70° C. and subjected to propylene polymerization under a pressure of 6 kg/cm$^2$ gauge for 4 hours introducing thereinto propylene gas. After the completion of polymerization reaction, solid polymer thus obtained is collected by filtration and dried by heating at 80° C. under reduced pressure. On the other hand, the filtrate is thickened to obtain polymer soluble in a solvent used in polymerization.

The amount of the polymer soluble in the solvent used in polymerization is represented by (A), and the amount of the solid polymer obtained as above is represented by (B). The solid polymer is subjected to extraction with boiling n-heptane for 6 hours to obtain polymer insoluble in boiling n-heptane, the amount of which is represented by (C). The polymerization activity (D) per unit weight of the catalyst component is represented by the formula $$(D) = \frac{[(A) + (B)] (g)}{\text{amount of catalyst component (g)}}$$

and the yield (E) of crystalline polymer is represented by the formula $$(E) = \frac{(C)}{(B)} \times 100\%$$

Further, the overall yield (F) of crystalline polymer is represented by the formula $$(F) = \frac{(C)}{(A) + (B)} \times 100\%$$

The chlorine content, melt index and bulk density of the produced polymer are represented by (G), (H) and (I) respectively.

Results thus obtained are shown in Table-1. The produced polymer thus obtained has a uniform round shape. The result of the measurement of the particle size distribution of the produced polymer shows that 95% of the produced polymer falls in the range of from 100μ to 500μ in size.

EXAMPLE 2

The procedures of Example 1 are repeated except that polymerization reaction is effected for 6 hours. Results thus obtained are shown in Table-1.

EXAMPLE 3

The procedures of Example 1 are repeated except that 4.0 g of basic magnesium carbonate is used to prepare a catalyst component. The titanium content in the solids separated is 3.31% by weight.

In the polymerization of propylene, the procedures of Example 1 are also repeated except that 64 mg of phenyltriethoxysilane is used. Results thus obtained are shown in Table-1.

EXAMPLE 4

The procedures of Example 1 are repeated except that 2.0 g of hydrotalcite in place of basic magnesium carbonate is used to prepare a catalyst component. The titanium content in the solids separated is 2.97% by weight. In the polymerization of propylene, the procedures of Example 1 are repeated. Results thus obtained are shown in Table-1.

EXAMPLE 5

The procedures of Example 1 are repeated except that 10 g of magnesium octanoate instead of magnesium stearate is used to prepare a catalyst component. The titanium content in the solids separated is 3.46% by weight. In the polymerization of propylene, the procedures of Example 1 are repeated. Results thus obtained are shown in Table-1.

EXAMPLE 6

The procedures of Example 1 are repeated except that 1.0 g of dipropylphthalate instead of dibutylphthalate is used to prepare a catalyst component. The titanium content in the solids separated is 3.61% by weight. In the polymerization of propylene, the procedures of Example 1 are repeated. Results thus obtained are shown in Table-1.

EXAMPLE 7

To a 200 ml round flask fitted with a stirrer and thoroughly purged with nitrogen are charged 10 g of magnesium stearate, 2 g of basic magnesium carbonate, 1.2 g of dibutylphthalate, and 25 ml of methylene dichloride to form a suspension followed by stirring for one hour under reflux. The suspension is then injected into 50 ml of TiCl$_4$ at room temperature in a 300 ml round flask fitted with a stirrer followed by heating up to 110° C. for reacting with agitation at that temperature for 2 hours. After the completion of the reaction, a reaction product is washed 10 times with 100 ml of dehydrated n-heptane at 40° C., and 50 ml of fresh titanium tetrachloride is added thereto for reacting with agitation at 110° C. for 2 hours. After the completion of the reaction, the reaction mixture is cooled down to 40° C. A washing procedure with 100 ml of dehydrated n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 3.01% by weight.

In the polymerization of propylene, the procedures of Example 1 are repeated. Results thus obtained are shown in Table-1.

EXAMPLE 8

The procedures of Example 7 are repeated except that 25 ml of o-dichlorobenzene instead of methylene dichloride is used to prepare a catalyst component. The titanium content in the solids separated is 3.18% by weight. In the polymerization of propylene, the procedures of Example 1 are repeated. Results thus obtained are shown in Table-1.

EXAMPLE 9

60 g of magnesium stearate, 12 g of basic magnesium carbonate and 8.5 mg of dibutylphthalate are charged into a 1.2-liter vibratory mill pot, 3/5 the total volume of which is filled with a stainless ball having a diameter of 25 mm, in an atmosphere of nitrogen to be copulverized for treatment at room temperature for 3 hours at a number of vibration of 1460 v.p.m. and amplitude of vibration of 2.5 mm. To a 200 ml round flask fitted with a cooler and stirrer, the air in which is replaced by nitrogen, 50 ml of titanium tetrachloride and 13.5 g of the solid copulverization product are charged to be reacted with agitation at 110° C. for 2 hours. After the completion of the reaction, a reaction product is washed 10 times with 100 ml of dehydrated n-heptane at 40° C., and 50 ml of fresh titanium tetrachloride is added thereto for reacting with agitation at 110° C. for 2 hours. After the completion of the reaction, a washing procedure with 100 ml of dehydrated n-heptane at 40° C. is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 3.69% by weight.

In the polymerization, the procedures of Example 1 are repeated. Results thus obtained are shown in Table-1.

EXAMPLE 10

40 g of magnesium stearate, 20 g of basic magnesium carbonate and 6.5 mg of dibutylphthalate are charged into a 1.2-liter vibratory mill pot, 3/5 the total volume of which is filled with a stainless ball having a diameter of 25 mm, in an atmosphere of nitrogen to be copulverized for treatment at room temperature for 3 hours at a number of vibration of 1460 v.p.m. and amplitude of vibration of 2.5 mm. To a 200 ml round flask fitted with a cooler and stirrer, the air in which is replaced by nitrogen, 50 ml of titanium tetrachloride and 16.7 g of the solid copulverization product are charged to be reacted with agitation at 110° C. for 2 hours. After the completion of the reaction, a reaction product is washed 10 times with 100 ml of dehydrated n-heptane at 40° C., and 50 ml of fresh titanium tetrachloride is added thereto for reacting with agitation at 110° C. for 2 hours. After the completion of the reaction, a washing procedure with 100 ml of dehydrated n-heptane at 40° C. is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 3.32% by weight.

In the polymerization, the procedures of Example 1 are repeated. Results thus obtained are shown in Table-1.

COMPARATIVE EXAMPLE 1

(Preparation of catalyst component)

To a 200 ml round flask fitted with a stirrer and thoroughly purged with nitrogen are charged 10 g of magnesium stearate, 2.0 g of basic magnesium carbonate, 1.6 ml of ethyl benzoate and 50 ml of TiCl$_4$ to be reacted with agitation at 65° C. for 2 hours. After the completion of the reaction, a reaction product is cooled down to 45° C. for leaving at rest. A resulting supernatant liquid is removed by decanting. A washing procedure with 100 ml of dehydrated n-heptane is then repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 1.74% by weight.

(Polymerization of propylene)

In the polymerization of propylene, the procedures of Example 1 are repeated except that 1.0 mg as titanium of the catalyst component and 137 mg of ethyl p-toluate are used. Results thus obtained are shown in Table-1.

The produced polymer is non-uniform in shape. The result of the measurement of the particle size distribution of the produced polymer shows that 45% of the produced polymer falls in the range of from 100$\mu$ to 500$\mu$ in size.

TABLE 1

|  | Examples | | | | | | | | | | Comparative Examples |
|---|---|---|---|---|---|---|---|---|---|---|---|
|  | 1 | 2 | 3 | 4 | 5 | 6 | 7 | 8 | 9 | 10 | 1 |
| Amount of polymer soluble in the solvent used in polymerization (A) g | 5.0 | 6.6 | 4.1 | 5.1 | 4.3 | 3.6 | 5.0 | 4.5 | 4.3 | 3.5 | 5.0 |

TABLE 1-continued

|  | Examples | | | | | | | | | | Comparative Examples |
|---|---|---|---|---|---|---|---|---|---|---|---|
|  | 1 | 2 | 3 | 4 | 5 | 6 | 7 | 8 | 9 | 10 | 1 |
| Amount of solid polymer (B) g | 210 | 277 | 184 | 206 | 195 | 178 | 199 | 191 | 180 | 185 | 301 |
| Amount of polymer insoluble in boiling n-heptane (C) g | 207 | 273 | 181 | 203 | 192 | 175 | 196 | 188 | 178 | 182 | 292 |
| Polymerization activity per unit weight of catalyst component (D) | 22210 | 29300 | 20760 | 20900 | 22990 | 21850 | 20460 | 20730 | 22670 | 20860 | 5320 |
| Yield of crystalline polymer (E) (%) | 98.6 | 98.6 | 98.4 | 98.5 | 98.5 | 98.3 | 98.5 | 98.4 | 98.8 | 98.4 | 97.0 |
| Overall yield of crystalline polymer (F) (%) | 96.3 | 96.3 | 96.2 | 96.2 | 96.3 | 96.4 | 96.1 | 96.2 | 96.6 | 96.6 | 95.4 |
| Chlorine content in the produced polymer (G) ppm | 17 | 13 | 18 | 17 | 16 | 17 | 18 | 18 | 16 | 18 | 69 |
| Melt index of the produced polymer (H) | 11.2 | 10.1 | 9.7 | 8.6 | 13.8 | 9.2 | 8.8 | 10.3 | 11.6 | 10.6 | 5.2 |
| Bulk density of the produced polymer (I) | 0.43 | 0.45 | 0.41 | 0.43 | 0.40 | 0.41 | 0.40 | 0.40 | 0.43 | 0.41 | 0.38 |

What is claimed is:

1. A catalyst component (A) for the polymerization of olefins obtained by a process comprising contacting (a) a fatty acid salt of magnesium and (b) a carbonate of magnesium or a substance containing said carbonate, (c) diester of an aromatic dicarboxylic acid, and (d) a titanium halide of the general formula: $TiX_4$, wherein X represents a halogen atom (hereinafter may be referred to as a titanium halide), said catalyst component being used in combination with (B) a silicon compound represented by the general formula: $SiR_m(OR')_{4-m}$, wherein R is hydrogen, alkyl group, or aryl group, R' is alkyl group or aryl group, and m is represented as $0 \leq m \leq 4$ (hereinafter may be referred to as a silicon compound), and with (C) an organoaluminium compound.

2. A catalyst component according to claim 1, wherein said catalyst component is prepared by a process which comprises pretreating the ingredients (a), (b) and (c), and mixing for contact the resulting mixture with the ingredient (d).

3. A catalyst component according to claim 2, wherein said pretreatment is effected by copulverization, suspension into a halogenated hydrocarbon, or by mixing for contact in an organic solvent.

4. A catalyst component according to claim 1, wherein said catalyst component is prepared by a process which comprises mixing for contact the ingredients (a), (b) and (d) with each other, and mixing for contact the resultant reaction mixture with the ingredient (c).

5. A catalyst component according to claim 1, wherein said catalyst component is prepared by a process which comprises mixing for contact the ingredients (a), (b), (c) and (d) simultaneously.

6. A catalyst component according to claim 1, wherein said catalyst component is prepared by a process which comprises contacting any two ingredients of the ingredients (a), (b), (c) and (d) with each other to be mixed for contact with the remaining two ingredients.

7. A catalyst component according to claim 1, wherein a surface active agent is added at any time in the course of the preparation of the catalyst component.

8. A catalyst component according to claim 1, wherein said fatty acid salt of magnesium is saturated fatty acid salt of magnesium.

9. A catalyst component according to claim 8, wherein said saturated fatty acid salt of magnesium is selected from magnesium stearate, magnesium octanoate, magnesium decanoate and magnesium laurate.

10. A catalyst component according to claim 1, wherein said ingredient (b) is selected from basic magnesium carbonate, magnesium carbonate and hydrotalcite.

11. A catalyst component according to claim 1, wherein diester of aromatic dicarboxylic acid is selected from diester of phthalic acid or terephthalic acid.

12. A catalyst component according to claim 11, wherein diester of phthalic acid or terephthalic acid is selected from dimethylphthalate, dimethylterephthalate, diethylphthalate, diethylterephthalate, dipropylphthalate, dipropylterephthalate, dibutylphthalate, dibutylterephthalate, diisobutylphthalate, diamylphthalate, diisoamylphthalate, ethylbutylphthalate, ethylisobutylphthalate and ethylpropylphthalate.

13. A catalyst component according to claim 1, wherein said titanium halide is titanium tetrachloride.

14. A catalyst component according to claim 1, wherein said silicon compound is selected from phenyl and alkylalkoxysilane.

15. A catalyst component according to claim 1, wherein said organoaluminium compound is selected from triethylaluminium and triisobutylaluminium.

16. A catalyst for the polymerization of olefins comprising: (A) a catalyst component obtained by a process comprising contacting (a) a fatty acid salt of magnesium and (b) a carbonate of magnesium or a substance containing said carbonate, (c) diester of an aromatic dicarboxylic acid, and (d) a titanium halide of the general formula: $TiX_4$, wherein X represents a halogen atom (hereinafter may be referred to as a titanium halide), (B) a silicon compound represented by the general formula: $SiR_m(OR')_{4-m}$, wherein R is hydrogen, alkyl group, or aryl group, R' is alkyl group or aryl group, and m is represented as $0 \leq m \leq 4$ (hereinafter may be referred to as a silicon compound), and (C) an organoaluminium compound.

17. A catalyst according to claim 16, wherein said catalyst component is prepared by: (i) a process which comprises pretreating the ingredients (a), (b) and (c), and mixing for contact the resulting mixture with the ingredient (d); (ii) a process which comprises mixing for contact the ingredients (a), (b) and (d) with each other, and mixing for contact the resultant reaction mixture with the ingredient (c); (iii) a process which comprises mixing for contact the ingredients (a), (b), (c) and (d) simultaneously; or (iv) a process which comprises contacting any two ingredients of the ingredients (a), (b), (c) and (d) with each other to be mixed for contact with the remaining two ingredients.

18. A catalyst according to claim 16, wherein said silicon compound is selected from phenyl and alkylalkoxysilane.

19. A catalyst according to claim 16, wherein said organoaluminium compound is trialkylaluminium.

20. A catalyst according to claim 19, wherein said trialkylaluminium is selected from triethylaluminium and triisobutylaluminium.

* * * * *